United States Patent
Chujoh et al.

(10) Patent No.: US 9,888,252 B2
(45) Date of Patent: *Feb. 6, 2018

(54) VIDEO ENCODING/DECODING METHOD AND APPARATUS FOR MOTION COMPENSATION PREDICTION

(71) Applicant: Kabushiki Kaisha Toshiba, Tokyo (JP)

(72) Inventors: Takeshi Chujoh, Tokyo (JP); Shinichiro Koto, Tokyo (JP); Yoshihiro Kikuchi, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 166 days.

This patent is subject to a terminal disclaimer.

(21) Appl. No.: 14/706,436

(22) Filed: May 7, 2015

(65) Prior Publication Data

US 2015/0237364 A1    Aug. 20, 2015

Related U.S. Application Data

(60) Continuation of application No. 13/875,912, filed on May 2, 2013, now Pat. No. 9,066,081, which is a
(Continued)

(30) Foreign Application Priority Data

Apr. 18, 2002 (JP) ................................ 2002-116718
Nov. 22, 2002 (JP) ................................ 2002-340042

(51) Int. Cl.
*H04N 19/174* (2014.01)
*H04N 19/176* (2014.01)
(Continued)

(52) U.S. Cl.
CPC ........... *H04N 19/51* (2014.11); *H04N 19/126* (2014.11); *H04N 19/174* (2014.11); *H04N 19/176* (2014.11)

(58) Field of Classification Search
CPC ....... H04N 19/00018; H04N 19/00024; H04N 19/0003; H04N 19/00151; H04N 19/00278
(Continued)

(56) References Cited

U.S. PATENT DOCUMENTS 5,602,593 A    2/1997  Katto
5,644,660 A    7/1997  Bruder
(Continued)

FOREIGN PATENT DOCUMENTS

CA    2090206        8/1993
JP    10-40156 A     2/1998
(Continued)

OTHER PUBLICATIONS

Wiegand, T. et al., "Multi-Frame Motion-Compensated Prediction for Video Transmission", Kluwer Academic Publishers, 2001.
(Continued)

*Primary Examiner* — Daquan Zhao
(74) *Attorney, Agent, or Firm* — Oblon, McClelland, Maier & Neustadt, L.L.P.

(57) ABSTRACT

A video encoding method and apparatus to select one combination, for each block of an input video signal, from a plurality of combinations. Each combination includes a predictive parameter and at least one reference picture number determined in advance for the reference picture. A prediction picture signal is generated in accordance with the reference picture number and predictive parameter of the selected combination. A predictive error signal is generated representing an error between the input video signal and the prediction picture signal. Encoding the predictive error signal, information of the motion vector, and index information indicating the selected combination is included.

12 Claims, 10 Drawing Sheets

Related U.S. Application Data continuation of application No. 13/041,081, filed on Mar. 4, 2011, now abandoned, which is a continuation of application No. 12/836,854, filed on Jul. 15, 2010, now abandoned, which is a division of application No. 12/791,018, filed on Jun. 1, 2010, now abandoned, which is a division of application No. 12/694,320, filed on Jan. 27, 2010, now abandoned, which is a division of application No. 12/635,738, filed on Dec. 11, 2009, now abandoned, which is a division of application No. 12/577,437, filed on Oct. 12, 2009, now abandoned, which is a division of application No. 12/323,930, filed on Nov. 26, 2008, now abandoned, which is a division of application No. 11/687,923, filed on Mar. 19, 2007, now Pat. No. 7,680,183, which is a division of application No. 10/754,535, filed on Jan. 12, 2004, now Pat. No. 7,450,643, which is a continuation of application No. PCT/JP03/04992, filed on Apr. 18, 2003.

(51) Int. Cl.
*H04N 19/126* (2014.01)
*H04N 19/51* (2014.01)

(58) Field of Classification Search
USPC ............ 375/240.12, 240.25, 240.14, 240.03, 375/240.2, 240.26; 382/233, 235, 238, 382/251, 250
See application file for complete search history.

(56) References Cited

U.S. PATENT DOCUMENTS

| | | |
|---|---|---|
| 5,666,170 A | 9/1997 | Stewart |
| 5,969,777 A | 10/1999 | Mawatari |
| 6,002,802 A | 12/1999 | Chujoh et al. |
| 6,018,366 A | 1/2000 | Asai et al. |
| 6,081,551 A | 6/2000 | Etoh |
| 6,104,754 A | 8/2000 | Chujoh et al. |
| 6,188,730 B1 | 2/2001 | Ngai et al. |
| 6,229,852 B1 | 5/2001 | Hoang |
| 6,249,318 B1 | 6/2001 | Girod et al. |
| 6,259,734 B1 | 7/2001 | Boon |
| 6,266,370 B1 | 7/2001 | Kamikura et al. |
| 6,289,132 B1 | 9/2001 | Goertzen |
| 6,310,915 B1 | 10/2001 | Wells et al. |
| 6,317,451 B1 | 11/2001 | Herreros |
| 6,317,461 B1 | 11/2001 | Chujoh et al. |
| 6,330,282 B1 | 12/2001 | Miyazaki |
| 6,414,972 B1 | 7/2002 | Hagai et al. |
| 6,453,072 B1 | 9/2002 | Hatakenaka |
| 6,456,658 B2 | 9/2002 | Kamikura et al. |
| 6,459,733 B1 | 10/2002 | Yokoyama et al. |
| 6,480,544 B1 | 11/2002 | Uehara et al. |
| 6,496,194 B1 | 12/2002 | Mikoshiba et al. |
| 6,549,575 B1 | 4/2003 | Butter et al. |
| 6,687,297 B2 | 2/2004 | Bruls |
| 6,704,358 B1 | 3/2004 | Li et al. |
| 6,744,924 B1 | 6/2004 | Hannuksela et al. |
| 6,744,926 B1 | 6/2004 | Nishigaki |
| 6,744,927 B1 | 6/2004 | Kato |
| 6,807,231 B1 | 10/2004 | Wiegand et al. |
| 6,925,126 B2 | 8/2005 | Lan et al. |
| 6,934,331 B2* | 8/2005 | Kamikura ............ H04N 19/105 375/240.11 |
| 6,973,125 B2 | 12/2005 | An |
| 6,973,126 B1 | 12/2005 | Yoneyama et al. |
| 7,043,358 B2 | 5/2006 | Ohno et al. |
| 7,154,952 B2 | 12/2006 | Tourapis et al. |
| 7,242,716 B2 | 7/2007 | Koto et al. |
| 7,266,150 B2* | 9/2007 | Demos .................. H04N 19/147 375/240.15 |
| 7,277,486 B2 | 10/2007 | Srinivasan et al. |
| 7,376,180 B2 | 5/2008 | Feher |
| 7,376,186 B2 | 5/2008 | Boyce et al. |
| 7,400,681 B2 | 7/2008 | Joch et al. |
| 7,450,643 B2 | 11/2008 | Chujoh et al. |
| 7,577,198 B2 | 8/2009 | Holcomb |
| 7,649,941 B2 | 1/2010 | Chujoh et al. |
| 7,649,942 B2 | 1/2010 | Chujoh et al. |
| 7,675,973 B2 | 3/2010 | Chujoh et al. |
| 7,675,975 B2 | 3/2010 | Chujoh et al. |
| 7,680,184 B2 | 3/2010 | Chujoh et al. |
| 2004/0008783 A1 | 1/2004 | Boyce |
| 2004/0008784 A1 | 1/2004 | Kikuchi et al. |
| 2004/0057523 A1 | 3/2004 | Koto et al. |
| 2004/0141675 A1 | 7/2004 | Kapaan et al. |
| 2004/0246373 A1 | 12/2004 | Kadono et al. |
| 2004/0258156 A1 | 12/2004 | Chujoh et al. |
| 2006/0093038 A1 | 5/2006 | Boyce |
| 2007/0058719 A1 | 3/2007 | Date et al. |
| 2007/0153905 A1 | 7/2007 | Chujoh et al. |
| 2007/0165723 A1 | 7/2007 | Chujoh et al. |
| 2009/0080513 A1 | 3/2009 | Chujoh et al. |
| 2009/0080522 A1 | 3/2009 | Chujoh et al. |
| 2009/0129476 A1 | 5/2009 | Chujoh et al. |
| 2009/0135907 A1 | 5/2009 | Chujoh et al. |
| 2009/0135912 A1 | 5/2009 | Chujoh et al. |
| 2009/0141801 A1 | 6/2009 | Chujoh et al. |
| 2009/0168879 A1 | 7/2009 | Chujoh et al. |
| 2009/0213931 A1 | 8/2009 | Chujoh et al. |
| 2009/0219996 A1 | 9/2009 | Chujoh et al. |
| 2009/0225854 A1 | 9/2009 | Chujoh et al. |
| 2009/0225858 A1 | 9/2009 | Chujoh et al. |
| 2009/0245355 A1 | 10/2009 | Chujoh et al. |
| 2009/0262831 A1 | 10/2009 | Chujoh et al. |
| 2009/0262832 A1 | 10/2009 | Chujoh et al. |
| 2009/0262834 A1 | 10/2009 | Chujoh et al. |
| 2009/0285288 A1 | 11/2009 | Chujoh et al. |
| 2009/0285294 A1 | 11/2009 | Chujoh et al. |
| 2009/0285295 A1 | 11/2009 | Chujoh et al. |
| 2009/0285296 A1 | 11/2009 | Chujoh et al. |
| 2009/0285297 A1 | 11/2009 | Chujoh et al. |
| 2009/0285298 A1 | 11/2009 | Chujoh et al. |
| 2009/0285304 A1 | 11/2009 | Chujoh et al. |
| 2009/0285305 A1 | 11/2009 | Chujoh et al. |
| 2010/0027627 A1 | 2/2010 | Chujoh et al. |
| 2010/0027636 A1 | 2/2010 | Chujoh et al. |

FOREIGN PATENT DOCUMENTS

| | | |
|---|---|---|
| JP | 10-136385 | 5/1998 |
| JP | 10-224795 | 8/1998 |
| JP | 10-248072 | 9/1998 |
| JP | 11-239351 | 8/1999 |
| JP | 2007-53799 | 3/2007 |
| JP | 2007-60713 | 3/2007 |
| JP | 4355755 B2 | 11/2009 |
| KR | 10-2006-0031888 | 4/2004 |

OTHER PUBLICATIONS

Yoshihiro Kikuchi, et al., "Multi-Frame Interpolative Prediction with Modified Syntax", Joint Video Team (JVT) of ISO/IEC MPEG & ITU-T VCEG, (ISO/IEC JTC1/SC29/VVG11 and ITU-T SG16 Q.6) XP-002461012, Date saved: May 1, 2002.

Yoshihiro Kikuchi, et al., "Improved Multiple Frame Motion Compensation Using Frame Interpolation", Joint Video Team (JVT) of ISO/IEC MPEG & ITU-TVCEG, (ISO/IEC JTC1/SC29/WG11 and ITU-T SG16 Q.6) XP-002340658, Jan. 29, 2002.

Trac D. Tran, "The BinDCT: Fast Multiplierless Approximation of the DCT", IEEE Signal Processing Letters, vol. 7, No. 6, Jun. 2000, pp. 141-144.

Gary J. Sullivan, et al., Preliminary Invitation to the Third JVT Meeting, Fairfax, VA, USA, May 6-10, 2002, JVT-C-TD-00 (JVT-C-TD00r0.doc), Version: Apr. 2, 2002.

K. Kamikura, et al., Global Brightness-Variation Compensation for Video Coding, IEEE Transactions on Circuits and Systems for Video Technology, vol. 8, No. 8, Dec. 1998, pp. 988-1000.

(56) References Cited

OTHER PUBLICATIONS

Extended European Search Report dated May 17, 2011, in Patent Application No. 11161328.7.
Byeong-Moon Jeon, "B pictures in JVT", Joint Video Team (JVT) of ISO/IEC MPEG & ITU-T VCEG (ISO/IEC JTC1/SC29/WG11 and ITU-T SG16 Q.6), XP 30005418, Jul. 22-26, 2002, 19 pages.
Hannuksela, "Issues on High-Level Syntax and Semantics Appendix: Changes relative to JVT-E022d7", Joint Video Team (JVT) of ISO/IEC MPEG and ITU-T VCEG, XP 30005538, Oct. 9-17, 2002, 28 pages.
Japanese Office Action dated Mar. 6, 2012 in patent application No. 2009-118121 with English translation.

\* cited by examiner

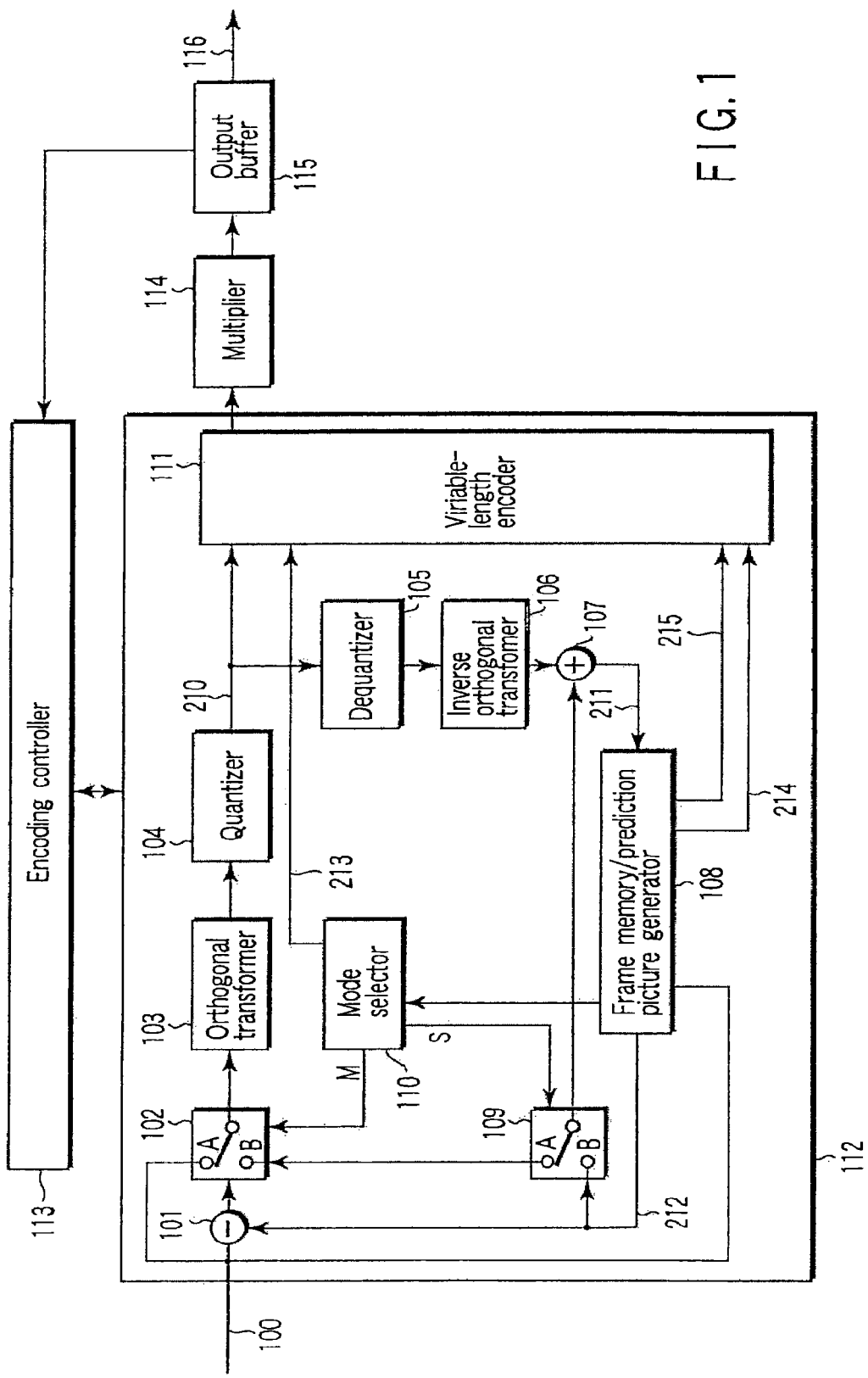
F I G. 1

| Index | Reference frame number | Predictive parameter (Y) | Predictive parameter (Cb) | Predictive parameter (Cr) |
|---|---|---|---|---|
| 0 | 1 | 1, 0 | 1, 0 | 1, 0 |
| 1 | 1, 2 | 2, -1, 0 | 1, 0, 0 | 1, 0, 0 |
| 2 | 1 | 5/4, 16 | 1, 0 | 1, 0 |
| 3 | 1, 2 | 3/2, -1/2, 0 | 1, 0, 0 | 1, 0, 0 |
| 4 | 2 | 1, 0 | 1, 0 | 1, 0 |
| 5 | 3 | 1, 0 | 1, 0 | 1, 0 |
| 6 | 4 | 1, 0 | 1, 0 | 1, 0 |
| 7 | 5 | 1, 0 | 1, 0 | 1, 0 |

| Index | Predictive parameter (Y) | Predictive parameter (Cb) | Predictive parameter (Cr) |
|---|---|---|---|
| 0 | 1, 0 | 1, 0 | 1, 0 |
| 1 | 3/4, -10 | 1, 0 | 1, 0 |
| 2 | 5/4, 16 | 1, 0 | 1, 0 |
| 3 | 3/4, -20 | 1, 0 | 1, 0 |
| 4 | 5/4, 32 | 1, 0 | 1, 0 |

FIG. 7

| Index | Predictive parameter (Y) | Predictive parameter (Cb) | Predictive parameter (Cr) |
|---|---|---|---|
| 0 | 1, 0, 0 | 1, 0, 0 | 1, 0, 0 |
| 1 | 2, -1, 0 | 1, 0, 0 | 1, 0, 0 |
| 2 | 3/2, -1/2, 0 | 1, 0, 0 | 1, 0, 0 |
| 3 | 1/2, 1/2, 0 | 1, 0, 0 | 1, 0, 0 |
| 4 | 0, 1, 0 | 0, 1, 0 | 0, 1, 0 |

FIG. 8

| Index i | Reference picture number | Luminance signal | | | Color difference signal | | | | |
|---|---|---|---|---|---|---|---|---|---|
| | | Flag | Predictive parameter Y | | Flag | Predictive parameter Cb | | Predictive parameter Cr | |
| | | | $D_1$ | $D_2$ | | $E_1$ | $E_2$ | $F_1$ | $F_2$ |
| 0 | 105 | 1 | 13 | 30 | 1 | 7 | 10 | 8 | 5 |
| 1 | 105 | 0 | | | 0 | | | | |
| 2 | 104 | 1 | 3 | 50 | 0 | | | | |
| 3 | 103 | 1 | 5 | 46 | 0 | | | | |

FIG. 9

| Index i | Reference number | Predictive parameter Y for luminance signal | | |
|---|---|---|---|---|
| | | Flag | $D_1$ | $D_2$ |
| 0 | 105 | 1 | 13 | 30 |
| 1 | 105 | 0 | | |
| 2 | 104 | 1 | 3 | 50 |
| 3 | 103 | 1 | 5 | 46 |

FIG. 10

| Frame index | Field index | Reference frame number | Reference field number | Luminance signal | | | Color difference signal | | | | | |
|---|---|---|---|---|---|---|---|---|---|---|---|---|
| | | | | Flag | Predictive parameter Y | | Flag | Predictive paramemter Cb | | | Predictive paramemter Cr | |
| | | | | | D1 | D2 | | E1 | E2 | | F1 | F2 |
| 0 | 0 | 105 | 210 | 1 | 13 | 30 | 1 | 7 | 10 | | 8 | 5 |
| | 1 | | 211 | | | | | | | | | |
| 1 | 2 | 105 | 210 | 0 | | | 0 | | | | | |
| | 3 | | 211 | | | | | | | | | |
| 2 | 4 | 104 | 208 | 1 | 3 | 50 | 0 | | | | | |
| | 5 | | 209 | | | | | | | | | |
| 3 | 6 | 103 | 206 | 1 | 5 | 46 | 0 | | | | | |
| | 7 | | 207 | | | | | | | | | |

F I G. 14

| Frame index | Field index | Reference frame number | Reference field number | Luminance signal | | | Color difference signal | | | |
|---|---|---|---|---|---|---|---|---|---|---|
| | | | | Flag | Predictive paramemter Y | | Flag | Predictive paramemter Cb | | Predictive paramemter Cr |
| | | | | | $D_1$ | $D_2$ | | $E_1$ | $E_2$ | $F_1$ | $F_2$ |
| 0 | 1 | 105 | 210 | 1 | 13 | 30 | 1 | 7 | 10 | 8 | 5 |
| | 0 | | 211 | 0 | | | | | | | |
| 1 | 3 | 105 | 210 | 1 | 3 | 50 | 0 | | | | |
| | 2 | | 211 | | | | | | | | |
| 2 | 5 | 104 | 208 | 1 | 5 | 46 | 0 | | | | |
| | 4 | | 209 | | | | | | | | |
| 3 | 7 | 103 | 206 | | | | | | | | |
| | 6 | | 207 | | | | | | | | |

F I G. 15

VIDEO ENCODING/DECODING METHOD AND APPARATUS FOR MOTION COMPENSATION PREDICTION

CROSS-REFERENCE TO RELATED APPLICATIONS

This is a continuation application of and claims the benefit of priority under 35 U.S.C. § 120 from U.S. application Ser. No. 13/875,912, filed May 2, 2013, which a continuation application of U.S. application Ser. No. 13/041,081, filed Mar. 4, 2011, which is a continuation of U.S. application Ser. No. 12/836,854 filed Jul. 15, 2010, which is a divisional of U.S. application Ser. No. 12/791,018, filed Jun. 1, 2010, the contents of each of which are incorporated herein by reference. U.S. application Ser. No. 12/791,018 is a divisional application of U.S. application Ser. No. 12/694,320, filed on Jan. 27, 2010, which is a divisional application of U.S. application Ser. No. 12/635,738, filed on Dec. 11, 2009, which is a divisional application of U.S. application Ser. No. 12/577,437, filed on Oct. 12, 2009, which is a divisional application of U.S. application Ser. No. 12/323,930, filed on Nov. 26, 2008, which is a divisional application of U.S. application Ser. No. 11/687,923, filed Mar. 19, 2007, which is a divisional application of U.S. application Ser. No. 10/754,535, filed on Jan. 12, 2004, which is a continuation application of International Application No. PCT/JP03/04992, filed Apr. 18, 2003, which was not published under PCT Article 21(2) in English.

This application is based upon and claims the benefit of priority from the prior Japanese Patent Applications No. 2002-116718, filed Apr. 18, 2002; and No. 2002-340042, filed Nov. 22, 2002, the entire contents of both of which are incorporated herein by reference.

BACKGROUND OF THE INVENTION

1. Field of the Invention

The present invention relates to a video encoding/decoding method and apparatus which encode/decode a fade video and dissolving video, in particular, at high efficiency.

2. Description of the Related Art

Motion compensation predictive inter-frame encoding is used as one of encoding modes in a video encoding standard scheme such as ITU-TH.261, H.263, ISO/IEC MPEG-2, or MPEG-4. As a predictive model in motion compensation predictive inter-frame encoding, a model that exhibits the highest predictive efficiency when no change in brightness occurs in the time direction is used. In the case of a fade video which changes in the brightness of pictures, there is no method known up to now which makes a proper prediction against a change in the brightness of pictures when, for example, a normal picture fades in from a black picture. In order to maintain picture quality in a fade video as well, therefore, a large number of bits are required.

In order to solve this problem, for example, in Japanese Patent No. 3166716, "Fade Countermeasure Video Encoder and Encoding Method", a fade video part is detected to change the allocation of the number of bits. More specifically, in the case of a fadeout video, a large number of bits are allocated to the start part of fadeout that changes in luminance. In general, the last part of fadeout becomes a monochrome picture, and hence can be easily encoded. For this reason, the number of bits allocated to this part is reduced. This makes it possible to improve the overall picture quality without excessively increasing the total number of bits.

In Japanese Patent No. 2938412, "Video Luminance Change Compensation Method, Video Encoding Apparatus, Video Decoding Apparatus, Recording Medium on Which Video Encoding or Decoding Program Is Recorded, and Recording Medium on Which Encoded Data of Video Is Recorded", there is proposed an encoding scheme of properly coping with a fade video by compensating for a reference picture in accordance with two parameters, i.e., a luminance change amount and contrast change amount.

In Thomas Wiegand and Berand Girod, "Multi-frame motion-compensated prediction for video transmission", Kluwer Academic Publishers 2001, an encoding scheme based on a plurality of frame buffers is proposed. In this scheme, an attempt has been made to improve the predictive efficiency by selectively generating a prediction picture from a plurality of reference frames held in the frame buffers.

According to the conventional techniques, in order to encode a fade video or dissolving video while maintaining high picture quality, a large number of bits are required. Therefore, an improvement in encoding efficiency cannot be expected.

BRIEF SUMMARY OF THE INVENTION

It is an object of the present invention to provide a video encoding/decoding method and apparatus which can encode a video which changes in luminance over time, e.g., a fade video or dissolving video, in particular, at high efficiency.

According to a first aspect of the present invention, there is provided a video encoding method of subjecting an input videos signal to motion compensation predictive encoding by using a reference picture signal representing at least one reference picture and a motion vector between the input video signal and the reference picture signal, comprising: selecting one combination, for each block of the input video signal, from a plurality of combinations each including a predictive parameter and at least one reference picture number determined in advance for the reference picture; generating a prediction picture signal in accordance with the reference picture number and predictive parameter of the selected combination; generating a predictive error signal representing an error between the input video signal and the prediction picture signal; and encoding the predictive error signal, information of the motion vector, and index information indicating the selected combination.

According to a second aspect of the present invention, there is provided a video decoding method comprising: decoding encoded data including a predictive error signal representing an error in a prediction picture signal with respect to a video signal, motion vector information, and index information indicating a combination of at least one reference picture number and a predictive parameter; generating a prediction picture signal in accordance with the reference picture number and predictive parameter of the combination indicated by the decoded index information; and generating a reproduction video signal by using the predictive error signal and the prediction picture signal.

BRIEF DESCRIPTION OF THE SEVERAL VIEWS OF THE DRAWING

FIG. 1 is a block diagram showing the arrangement of a video encoding apparatus according to the first embodiment of the present invention;

FIG. 7 is a view showing an example of a table of combinations of predictive parameters in a case wherein the number of reference frames is one and a reference frame number is sent as mode information according to the second embodiment of the present invention;

FIG. 8 is a view showing an example of a table of combinations of predictive parameters in a case wherein the number of reference frames is two and a reference frame number is sent as mode information according to the second embodiment;

FIG. 9 is a view showing an example of a table of combinations of reference picture numbers and predictive parameters in a case wherein the number of reference frame parameters is one according to the third embodiment of the present invention;

FIG. 10 is a view showing an example of a table for only luminance signals according to the third embodiment;

FIG. 14 is a view showing an example of a table of reference frame numbers, reference field numbers, and predictive parameters when information to be encoded is a top field according to the fourth embodiment of the present invention; and FIG. 15 is a view showing an example of a table of reference frame numbers, reference field numbers, and predictive parameters when information to be encoded is a bottom field according to the fourth embodiment of the present invention.

DETAILED DESCRIPTION OF THE INVENTION

Figures 2, 3:
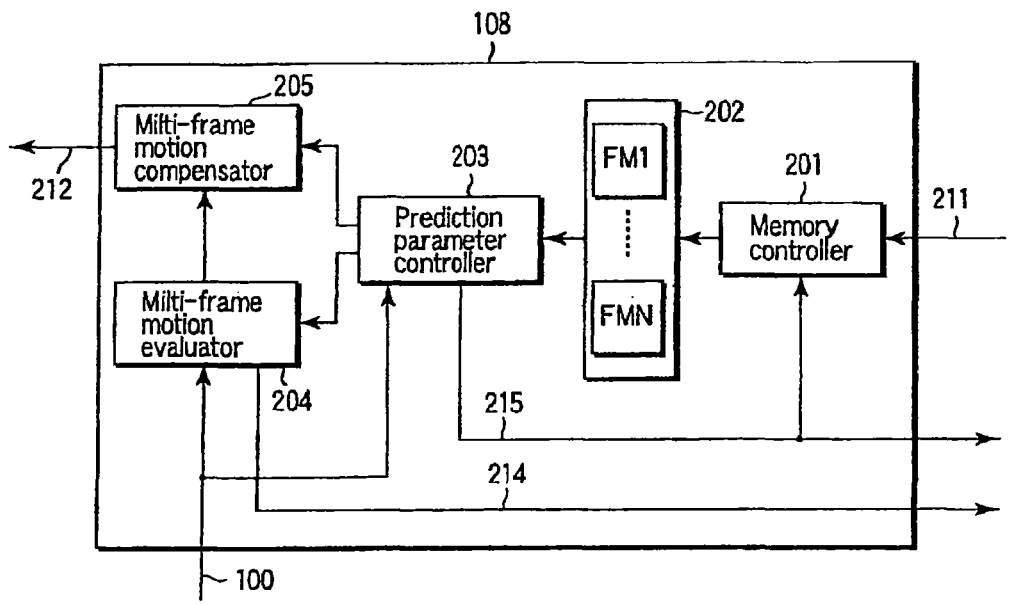
FIG. 2 is a block diagram showing the detailed arrangement of a frame memory/prediction picture generator in FIG. 1.
FIG. 3 is a view showing an example of a table of combinations of reference frame numbers and predictive parameters, which is used in the first embodiment.

The embodiments of the present invention will be described below with reference to the several views of the accompanying drawing.
[First Embodiment]
(About Encoding Side)

FIG. 1 shows the arrangement of a video encoding apparatus according to the first embodiment of the present invention. A video signal 100 is input to the video encoding apparatus, for example, on a frame basis. The video signal 100 is input to a subtracter 101. The subtracter 101 calculates the difference between the video signal 100 and a prediction picture signal 212 to generate a predictive error signal. A mode selection switch 102 selects either the predictive error signal or the video signal 100. An orthogonal transformer 103 subjects the selected signal to an orthogonal transformation, e.g., a discrete cosine transform (DCT). The orthogonal transformer 103 generates orthogonal transformation coefficient information, e.g., DCT coefficient information. The orthogonal transformation coefficient information is quantized by a quantizer 104 and branched into two paths. One quantization orthogonal transformation coefficient information 210 branched into two paths is guided to a variable-length encoder 111.

The other quantization orthogonal transformation coefficient information 210 branched into the two paths is sequentially subjected to processing reverse to that in the quantizer 104 and orthogonal transformer 103 by a dequantizer or inverse quantizer 105 and inverse orthogonal transformer 106 to be reconstructed into a predictive error signal. Thereafter, an adder 107 adds the reconstructed predictive error signal to the prediction picture signal 212 input through a switch 109 to generate a local decoded video signal 211. The local decoded video signal 211 is input to a frame memory/ prediction picture generator 108.

The frame memory/prediction picture generator 108 selects one of a plurality of combinations of prepared reference frame numbers and predictive parameters. The linear sum of the video signal (local decoded video signal 211) of the reference frame indicated by the reference frame number of the selected combination is calculated in accordance with the predictive parameter of the selected combination, and the resultant signal is added to an offset based on the predictive parameter. With this operation, in this case, a reference picture signal is generated on a frame basis. Subsequently, the frame memory/prediction picture generator 108 motion-compensates for the reference picture signal by using a motion vector to generate the prediction picture signal 212.

In this process the frame memory/prediction picture generator 108 generates motion vector information 214 and index information 215 indicating a selected combination of a reference frame number and a predictive parameter, and sends information necessary for selection of an encoding mode to a mode selector 110. The motion vector information 214 and index information 215 are input to a variable-length encoder 111. The frame memory/prediction picture generator 108 will be described in detail later.

The mode selector 110 selects an encoding mode on a macroblock basis on the basis of predictive information P from the frame memory/prediction picture generator 108, i.e., selects either the intraframe encoding mode or the motion compensated predictive interframe encoding mode, and outputs switch control signals M and S.

In the intraframe encoding mode, the switches 102 and 112 are switched to the A side by the switch control signals M and S, and the input video signal 100 is input to the orthogonal transformer 103. In the interframe encoding mode, the switches 102 and 112 are switched to the B side by the switch control signals M and S. As a consequence, the predictive error signal from the subtracter 101 is input to the orthogonal transformer 103, and the prediction picture signal 212 from the frame memory/prediction picture generator 108 is input to the adder 107. Mode information 213 is output from the mode selector 110 and input to the variable-length encoder 111.

The variable-length encoder 111 subjects the quantization orthogonal transformation coefficient information 210, mode information 213, motion vector information 214, and index information 215 to variable-length encoding. The variable-length codes generated by this operation are multiplexed by a multiplier 114. The resultant data is then smoothed by an output buffer 115. Encoded data 116 output from the output buffer 115 is sent out to a transmission system or storage system (not shown).

An encoding controller 113 controls an encoding unit 112. More specifically, the encoding controller 113 monitors the buffer amount of the output buffer 115, and controls encoding parameters such as the quantization step size of the quantizer 104 to make the buffer amount constant.

(About Frame Memory/Prediction Picture Generator 108)

FIG. 2 shows the detailed arrangement of the frame memory/prediction picture generator 108 in FIG. 1. Referring to FIG. 2, the local decoded video signal 211 input from the adder 107 in FIG. 1 is stored in a frame memory set 202 under the control of a memory controller 201. The frame memory set 202 has a plurality of (N) frame memories FM1 to FMN for temporarily holding the local decoded video signal 211 as a reference frame.

In a predictive parameter controller 203 is prepared a plurality of combinations of reference frame numbers and predictive parameters in advance as a table. The predictive parameter controller 203 selects, on the basis of the video signal 100, a combination of the reference frame number of a reference frame and a predictive parameter that is used to generate the prediction picture signal 212, and outputs the index information 215 indicating the selected combination.

A multi-frame motion evaluator 204 generates a reference picture signal in accordance with the combination of the reference frame number and the index information selected by the predictive parameter controller 203. The multi-frame motion evaluator 204 evaluates the motion amount and predictive error from this reference picture signal and input video signal 100, and outputs the motion vector information 214 that minimizes the predictive error. A multi-frame motion compensator 205 carries out motion-compensation for each block using a reference picture signal selected by the multi-frame motion evaluator 204 in accordance with the motion vector to generate the prediction picture signal 212.

The memory controller 201 sets a reference frame number to a local decoded video signal for each frame, and stores each frame in one of the frame memories FM1 to FMN of the frame memory set 202. For example, the respective frames are sequentially numbered from the frame nearest to the input picture. The same reference frame number may be set for different frames. In this case, for example, different predictive parameters are used. A frame near to the input picture is selected from the frame memories FM1 to FMN and sent to the predictive parameter controller 203.

(About Table of Combinations of Reference Frame Numbers and Prediction Parameters)

FIG. 3 shows an example of the table of combinations of reference frame numbers and predictive parameters, which is prepared in the predictive parameter controller 203. "Index" corresponds to prediction pictures that can be selected for each block. In this case, there are eight types of prediction pictures. A reference frame number n is the number of a local decoded video used as a reference frame, and in this case, indicates the number of a local decoded video corresponding to n past frames.

When the prediction picture signal 212 is generated by using the picture signals of a plurality of reference frames stored in the frame memory set 202, a plurality of reference frame numbers are designated, and (the number of reference frames+1) coefficients are designated as predictive parameters for each of a luminance signal (Y) and color difference signals (Cb and Cr). In this case, as indicated by equations (1) to (3), n assumes the number of reference frames, n+1 predictive parameters Di (i=1, ..., n+1) are prepared for the luminance signal Y; n+1 predictive parameters Ei (i=1, ..., n+1), for the color difference signal Cb; and n+1 predictive parameters Fi (i=1, ..., n+1), for the color difference signal Cr:

$$Y_t = \sum_{i=1}^{n} D_i Y_{t-i} + D_{n+1} \quad (1)$$

$$Cb_t = \sum_{i=1}^{n} E_i Cb_{t-i} + E_{n+1} \quad (2)$$

$$Cr_t = \sum_{i=1}^{n} F_i Cr_{t-i} + F_{n+1} \quad (3)$$

This operation will be described in more detail with reference to FIG. 3. Referring to FIG. 3, the last numeral of each predictive parameter represents an offset, and the first numeral of each predictive parameter represents a weighting factor (predictive coefficient). For index 0, the number of reference frames is given by n=2, the reference frame number is 1, and predictive parameters are 1 and 0 for each of the luminance signal Y and color difference signals Cr and Cb. What the predictive parameters are 1 and 0 as in this case indicates that a local decoded video signal corresponding to the reference frame number "1" is multiplied by 1 and added to offset 0. In other words, the local decoded video signal corresponding to the reference frame number 1 becomes a reference picture signal without any change.

For index 1, two reference frames as local decoded video signals corresponding to the reference frame numbers 1 and 2 are used. In accordance with predictive parameters 2, −1, and 0 for the luminance signal Y, the local decoded video signal corresponding to the reference frame number 1 is doubled, and the local decoded video signal corresponding to the reference frame number 2 is subtracted from the resultant signal. Offset 0 is then added to the resultant signal. That is, extrapolation prediction is performed from the local decoded video signals of two frames to generate a reference picture signal. For the color difference signals Cr and Cb, since predictive parameters are 1, 0, and 0, the local decoded video signal corresponding to the reference frame number 1 is used as a reference picture signal without any change. This predictive scheme corresponding to index 1 is especially effective for a dissolving video.

For index 2, in accordance with predictive parameters 5/4 and 16, the local decoded video signal corresponding to the reference frame number 1 is multiplied by 5/4 and added with offset 16. For the color difference signals Cr and Cb, since the predictive parameter is 1, the color difference signals Cr and Cb become reference picture signals without any change. This predictive scheme is especially effective for a fade-in video from a black frame.

In this manner, reference picture signals can be selected on the basis of a plurality of predictive schemes with different combinations of the numbers of reference frames to be used and predictive parameters. This makes it possible for this embodiment to properly cope with a fade video and dissolving video that have suffered deterioration in picture quality due to the absence of a proper predictive scheme.

(About Sequence for Selecting Prediction Scheme and Determining Encoding Mode)

Figure 4:
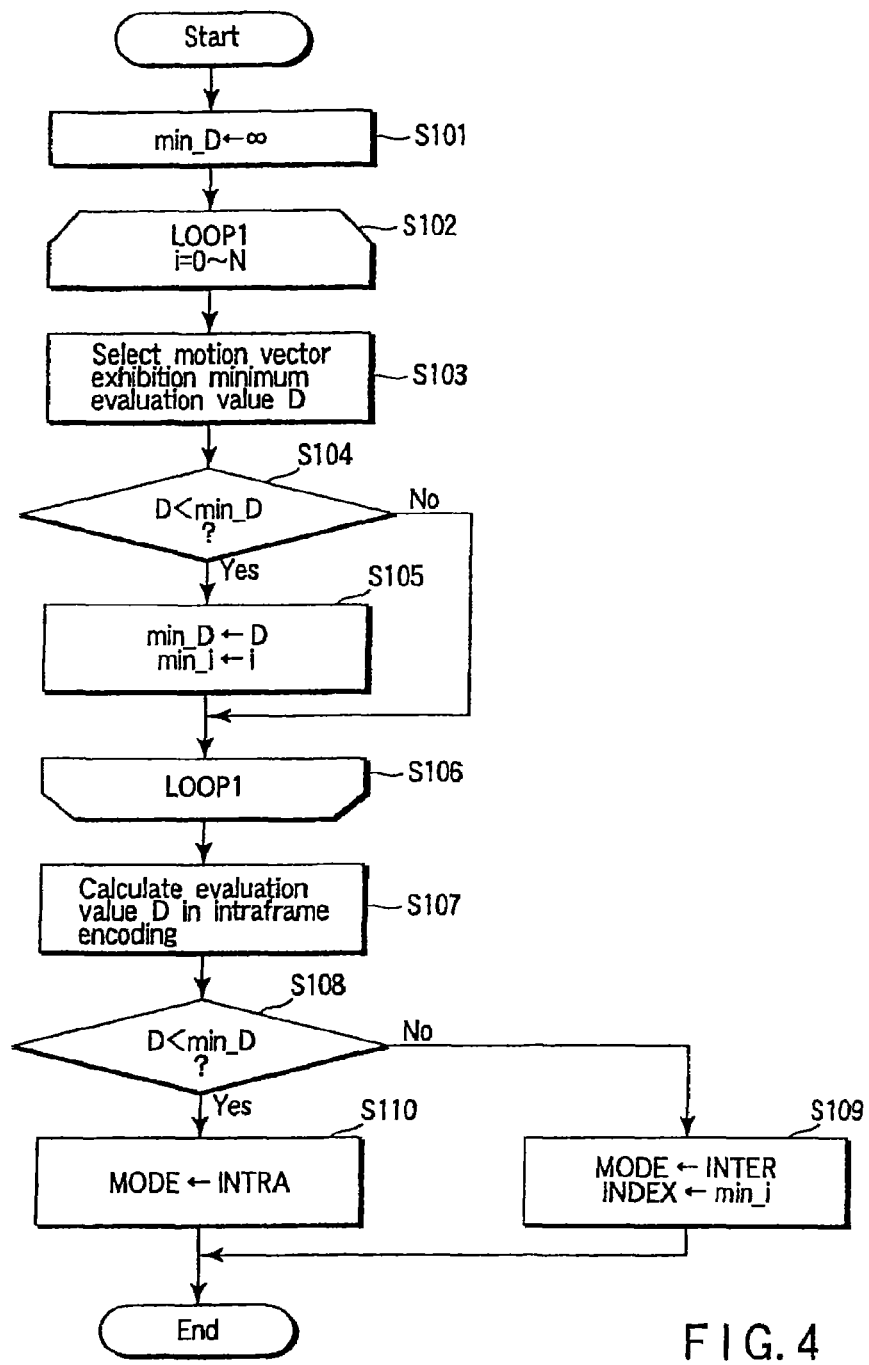
FIG. 4 is a flow chart showing an example of a sequence for selecting a predictive scheme (a combination of a reference frame number and a predictive parameter) for each macroblock and determining an encoding mode in the first embodiment.

An example of a specific sequence for selecting a predictive scheme (a combination of a reference frame numbers and a predictive parameter) for each macroblock and determining an encoding mode in this embodiment will be described next with reference to FIG. 4.

First of all, a maximum assumable value is set to variable min_D (step S101). LOOP1 (step S102) indicates a repetition for the selection of a predictive scheme in interframe encoding, and variable i represents the value of "index" in FIG. 3. In this case, in order to obtain an optimal motion vector for each predictive scheme, an evaluation value D of each index (each combination of a reference frame number and a predictive parameter) is calculated from the number of bits associated with motion vector information 214 (the number of bits of a variable-length code output from the variable-length encoder 111 in correspondence with the motion vector information 214) and a predictive error absolute value sum, and a motion vector that minimizes the evaluation value D is selected (step S103). The evaluation value D is compared with min_D (step S104). If the evaluation value D is smaller than min_D, the evaluation value D is set to min_D, and index i is assigned to mini_i (step S105).

An evaluation value D for intraframe encoding is then calculated (step S106). The evaluation value D is compared with min_D (step S107). If this comparison indicates that min_D is smaller than the evaluation value D, mode MODE is determined as interframe encoding, and mini_i is assigned to index information INDEX (step S108). If the evaluation value D is smaller, mode MODE is determined as intraframe encoding (step S109). In this case, the evaluation value D is set as the estimated value of the number of bits with the same quantization step size.

(About Decoding Side)

Figure 5:
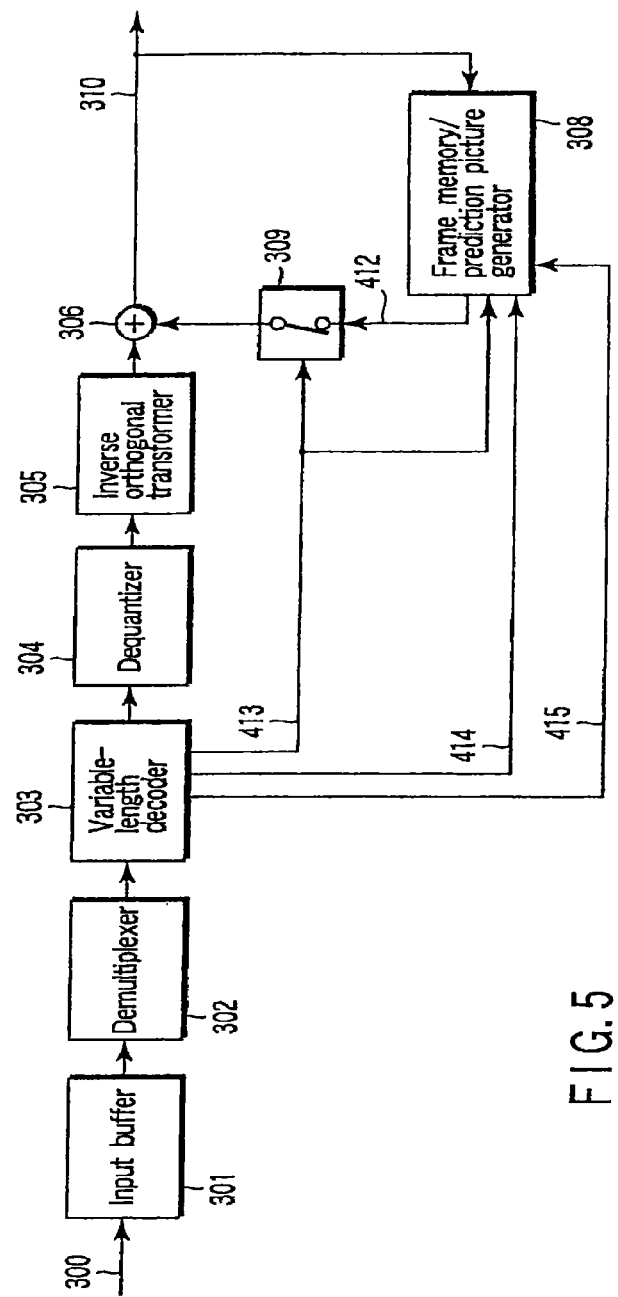
FIG. 5 is a block diagram showing the arrangement of a video decoding apparatus according to the first embodiment.

A video decoding apparatus corresponding to the video encoding apparatus shown in FIG. 1 will be described next. FIG. 5 shows the arrangement of the video decoding apparatus according to this embodiment. Encoded data 300 sent out from the video encoding apparatus show in FIG. 1 and sent through a transmission system or storage system is temporarily stored in an input buffer 301 and demultiplexed by a demultiplexer 302 for each frame on the basis of a syntax. The resultant data is input to a variable-length decoder 303. The variable-length decoder 303 decodes the variable-length code of each syntax of the encoded data 300 to reproduce a quantization orthogonal transformation coefficient, mode information 413, motion vector information 414, and index information 415.

Of the reproduced information, the quantization orthogonal transformation coefficient is dequantized by a dequantizer 304 and inversely orthogonal-transformed by an inverse orthogonal transformer 305. If the mode information 413 indicates the intraframe encoding mode, a reproduction video signal is output from the inverse orthogonal transformer 305. This signal is then output as a reproduction video signal 310 through an adder 306.

If the mode information 413 indicates the interframe encoding mode, a predictive error signal is output from the inverse orthogonal transformer 305, and a mode selection switch 309 is turned on. The prediction picture signal 412 output from a frame memory/prediction picture generator 308 is added to the predictive error signal by the adder 306. As a consequence, the reproduction video signal 310 is output. The reproduction video signal 310 is stored as a reference picture signal in the frame memory/prediction picture generator 308.

The mode information 413, motion vector information 414, and index information 415 are input to the frame memory/prediction picture generator 308. The mode information 413 is also input to the mode selection switch 309. In the intraframe encoding mode, the mode selection switch 309 is turned off. In the interframe encoding mode, the switch is turned on.

Like the frame memory/prediction picture generator 108 on the encoding side in FIG. 1, the frame memory/prediction picture generator 308 includes a plurality of prepared combinations of reference frame numbers and predictive parameters as a table, and selects one combination indicated by the index information 415 from the table. The linear sum of the video signal (reproduction video signal 210) of the reference frame indicated by the reference frame number of the selected combination is calculated in accordance with the predictive parameter of the selected combination, and an offset based on the predictive parameter is added to the resultant signal. With this operation, a reference picture signal is generated. Subsequently, the generated reference picture signal is motion-compensated for by using the motion vector indicated by the motion vector information 414, thereby generating a prediction picture signal 412.

(About Frame Memory/Prediction Picture Generator 308)

Figure 6:
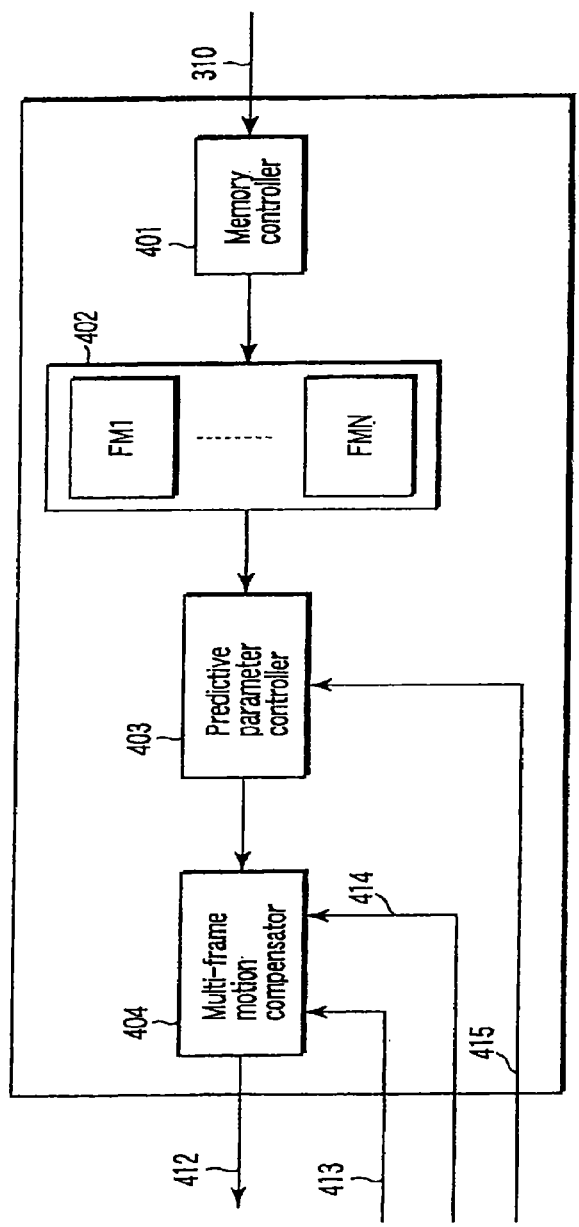
FIG. 6 is a block diagram showing the detailed arrangement of the frame memory/prediction picture generator in FIG. 5.

FIG. 6 shows the detailed arrangement of the frame memory/prediction picture generator 308 in FIG. 5. Referring to FIG. 6, the reproduction video signal 310 output from the adder 306 in FIG. 5 is stored in the frame memory set 402 under the control of a memory controller 401. The frame memory set 402 has a plurality of (N) frame memories FM1 to FMN for temporarily holding the reproduction video signal 310 as a reference frame.

A predictive parameter controller 403 has in advance combinations of reference frame numbers and predictive parameters as a table like the one shown in FIG. 3. The predictive parameter controller 403 selects a combination of the reference frame number of a reference frame and a predictive parameter, which are used to generate the prediction picture signal 412, on the basis of the index information 415 from the variable-length decoder 303 in FIG. 5. A plurality of multi-frame motion compensators 404 generate a reference picture signal in accordance with a combination of a reference frame number and index information, which is selected by the predictive parameter controller 403, and performs motion-compensation for each block using this reference picture signal in accordance with the motion vector indicated by the motion vector information 414 from the variable-length decoder 303 in FIG. 5, thereby generating the prediction picture signal 412.

[Second Embodiment]

The second embodiment of the present invention will be described next with reference to FIGS. 7 and 8. Since the overall arrangements of a video encoding apparatus and video decoding apparatus in this embodiment are almost the same as those in the first embodiment, only the differences from the first embodiment will be described.

In this embodiment, there is described an example of the manner of expressing predictive parameters based on a scheme of capable of designating a plurality of reference frame numbers in accordance with mode information of a macroblock basis. A reference frame number is discriminated by the mode information for each macroblock. This embodiment therefore uses a table of predictive parameters as shown in FIGS. 7 and 8 instead of using a table of combinations of reference frame numbers and predictive parameters as in the first embodiment. That is, index information does not indicate a reference frame number, and only a combination of predictive parameters is designated.

The table in FIG. 7 shows an example of a combination of predictive parameters when the number of reference frames is one. As predictive parameters, (the number of reference frames+1) parameters, i.e., two parameters (one weighting factor and one offset), are designated for each of a luminance signal (Y) and color difference signals (Cb and Cr).

The table in FIG. 8 shows an example of a combination of predictive parameters when the number of reference frames is two. In this case, as predictive parameters, (the number of reference frames+1) parameters, i.e., three parameters (two weighting factors and one offset), are designated fro each of a luminance signal (Y) and color difference signals (Cb and Cr). This table is prepared for the encoding side and decoding side each as in the first embodiment.

[Third Embodiment]

The third embodiment of the present invention will be described with reference to FIGS. 9 and 10. Since the overall arrangements of a video encoding apparatus and video decoding apparatus in this embodiment are almost the same as those in the first embodiment, only the differences from the first and second embodiments will be described below.

In the first and second embodiments, a video is managed on a frame basis. In this embodiment, however, a video is managed on a picture basis. If both a progressive signal and an interlaced signal exist as input picture signals, pictures are not necessarily encoded on a frame basis. In consideration of this, a picture assumes (a) a picture of one frame of a progressive signal, (b) a picture of one frame generated by merging two fields of an interlaced signal, or (c) a picture of one field of an interlaced signal.

If a picture to be encoded is a picture with a frame structure like (a) or (b), a reference picture used in motion compensation prediction is also managed as a frame regardless of whether the encoded picture, which is the reference picture, has a frame structure or field structure. A reference picture number is assigned to this picture. Likewise, if a picture to be encoded is a picture with a field structure like (c), a reference picture used in motion compensation prediction is also managed as a field regardless of whether the encoded picture, which is the reference picture, has a frame structure or field structure. A reference picture number is assigned to this picture.

Equations (4), (5), and (6) are examples of predictive equations for reference picture numbers and predictive parameters, which are prepared in the predictive parameter controller 203. These examples are predictive equations for generating a prediction picture signal by motion compensation prediction using one reference picture signal.

$$Y=\text{clip}((D_1(i) \times R_Y(i)+2^{L_Y-1}) >> L_Y+D_2(i)) \quad (4)$$

$$Cb=\text{clip}((E_1(i) \times (R_{Cb}(i)-128)+2^{L_C-1}) >> L_C+E_2(i)+128) \quad (5)$$

$$Cr=\text{clip}((F_1(i) \times (R_{Cr}(i)-128)+2^{L_C-1}) >> L_C+F_2(i)+128) \quad (6)$$

where Y is a prediction picture signal of a luminance signal, Cb and Cr are prediction picture signals of two color difference signals, $R_Y(i)$, $R_{Cb}(i)$, and $R_{Cr}(i)$ are the pixel values of the luminance signal and two color difference signals of a reference picture signal with index $i$, $D_1(i)$ and $D_2(i)$ are the predictive coefficient and offset of the luminance signal with index $i$, $E_1(i)$ and $E_2(i)$ are the predictive coefficient and offset of the color difference signal Cb with index $i$, and $F_1(i)$ and $F_2(i)$ are the predictive coefficient and offset of the color difference signal Cr with index $i$. Index $i$ indicates a value from 0 (the maximum number of reference pictures−1), and encoded for each block to be encoded (e.g., for each macroblock). The resultant data is then transmitted to the video decoding apparatus.

The predictive parameters $D_1(i)$, $D_2(i)$, $E_1(i)$, $E_2(i)$, $F_1(i)$, and $F_2(i)$ are represented by values determined in advance between the video encoding apparatus and the video decoding apparatus or a unit of encoding such as a frame, field, or slice, and are encoded together with encoded data to be transmitted from the video encoding apparatus to the video decoding apparatus. With this operation, these parameters are shared by the two apparatuses.

The equations (4), (5), and (6) are predictive equations wherein powers of 2, i.e., 2, 4, 8, 16, . . . are selected as the denominators of predictive coefficients by which reference picture signals are multiplied. The predictive equations can eliminate the necessity of division and be calculated by arithmetic shifts. This makes it possible to avoid a large increase in calculation cost due to division.

In equations (4), (5), and (6), ">>" of a >>b represents an operator for arithmetically shifting an integer $a$ to the right by $b$ bits. The function "clip" represents a clipping function for setting the value in "( )" to 0 when it is smaller than 0, and setting the value to 255 when it is larger than 255.

In this case, assuming that $L_Y$ is the shift amount of a luminance signal, and $L_C$ is the shift amount of a color difference signal. As these shift amounts $L_Y$ and $L_C$, values determined in advance between the video encoding apparatus and the video decoding apparatus are used. The video encoding apparatus encodes the shift amounts $L_Y$ and $L_C$, together with a table and encoded data, in a predetermined unit of encoding, e.g., a frame, field, or slice, and transmits the resultant data to the video decoding apparatus. This allows the two apparatuses to share the shift amounts $L_Y$ and $L_C$.

In this embodiment, tables of combinations of reference picture numbers and predictive parameters like those shown in FIGS. 9 and 10 are prepared in the predictive parameter controller 203 in FIG. 2. Referring to FIGS. 9 and 10, index $i$ corresponds to prediction pictures that can be selected for each block. In this case, four types of prediction pictures are present in correspondence with 0 to 3 of index $i$. "Reference picture number" is, in other words, the number of a local decoded video signal used as a reference picture.

"Flag" is a flag indicating whether or not a predictive equation using a predictive parameter is applied to a reference picture number indicated by index $i$. If Flag is "0", motion compensation prediction is performed by using the local decoded video signal corresponding to the reference picture number indicated by index $i$ without using any predictive parameter. If Flag is "1", a prediction picture is generated according to equations (4), (5), and (6) by using a local decoded video and predictive parameter corresponding to the reference picture number indicated by index $i$, thus performing motion compensation prediction. This information of Flag is also encoded, together with a table and encoded data, by using a value determined in advance between the video encoding apparatus and the video decoding apparatus or in a predetermined unit of encoding, e.g., a frame, field, or slice, in the video encoding apparatus. The resultant data is transmitted to the video decoding apparatus. This allows the two apparatuses to share the information of Flag.

In these cases, a prediction picture is generated by using a predictive parameter when index i=0 with respect to a reference picture number 105, and motion compensation prediction is performed without using any predictive parameter when i=1. As described above, a plurality of predictive schemes may exist for the same reference picture number.

The table shown in FIG. 9 has predictive parameters $D_1(i)$, $D_2(i)$, $E_1(i)$, $E_2(i)$, $F_1(i)$, and $F_2(i)$ assigned to a luminance signal and two color difference signals in correspondence with equations (4), (5), and (6). FIG. 10 shows an example of a table in which predictive parameters are assigned to only luminance signals. In general, the number of bits of a color difference signal is not very large compared with the number of bits of a luminance signal. For this reason, in order to reduce the amount of calculation required to generate a prediction picture and the number of bits transmitted in a table, a table is prepared, in which predictive parameters for color difference signals are omitted as shown in FIG. 10 and predictive parameters are assigned to only luminance signals. In this case, only equation (4) is used as a predictive equation.

Equations (7) to (12) are predictive equations in a case wherein a plurality of (two in this case) reference pictures are used.

$$P_Y(i)=(D_1(i)\times R_Y(i)+2^{L_Y-1})>>L_Y+D_2(i) \quad (7)$$

$$P_{Cb}(i)=(E_1(i)\times(R_{Cb}(i)-128)+2^{L_C-1})>>L_C+E_2(i)+128 \quad (8)$$

$$P_{Cr}(i)=(F_1(i)\times(R_{Cr}(i)-128)+2^{L_C-1})>>L_C+F_2(i)+128 \quad (9)$$

$$Y=\text{clip}((P_Y(i)+P_Y(j)+1)>>1) \quad (10)$$

$$Cb=\text{clip}((P_{Cb}(i)+P_{Cb}(j)+1)>>1) \quad (11)$$

$$Cr=\text{clip}((P_{Cr}(i)+P_{Cr}(j)+1)>>1) \quad (12)$$

The pieces of information of the predictive parameters $D_1(i)$, $D_2(i)$, $E_1(i)$, $E_2(i)$, $F_1(i)$, $F_2(i)$, LY, and LC and Flag are values determined in advance between the video encoding apparatus and the video decoding apparatus or encoded, together with encoded data, in a unit of encoding such as a frame, field, or slice, and are transmitted from the video encoding apparatus to the video decoding apparatus. This allows the two apparatuses to share these pieces of information.

If a picture to be decoded is a picture having a frame structure, a reference picture used for motion compensation prediction is also managed as a frame regardless of whether a decoded picture as a reference picture has a frame structure or field structure. A reference picture number is assigned to this picture. Likewise, if a picture to be programmed is a picture having a field structure, a reference picture used for motion compensation prediction is also managed as a field regardless of whether a decoded picture as a reference picture has a frame structure or field structure. A reference picture number is assigned to this picture.

(About Syntax of Index Information)

Figure 11:
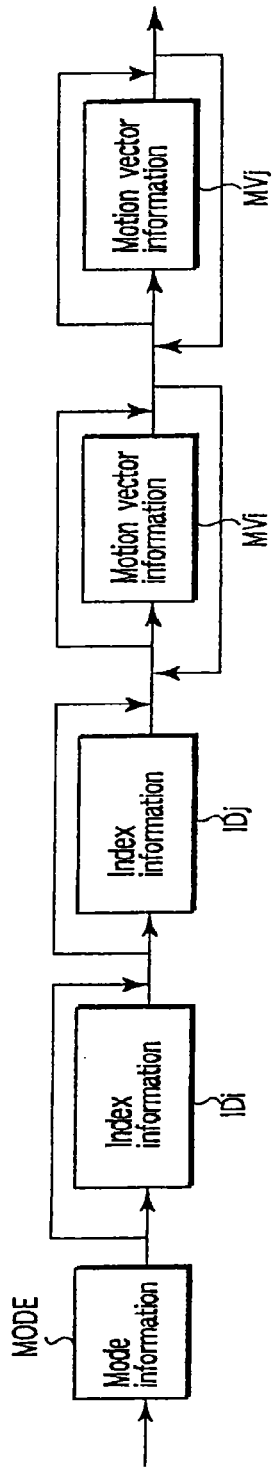
FIG. 11 is a view showing an example of a syntax for each block when index information is to be encoded.

FIG. 11 shows an example of a syntax in a case wherein index information is encoded in each block. First of all, mode information MODE is present for each block. It is determined in accordance with the mode information MODE whether or not index information IDi indicating the value of index i and index information IDj indicating the value of index j are encoded. Encoded information of motion vector information MVi for the motion compensation prediction of index i and motion vector information MVj for the motion predictive compensation of index j is added as motion vector information for each block after encoded index information.

(About Data Structure of Encoded Bit Stream)

Figure 12:
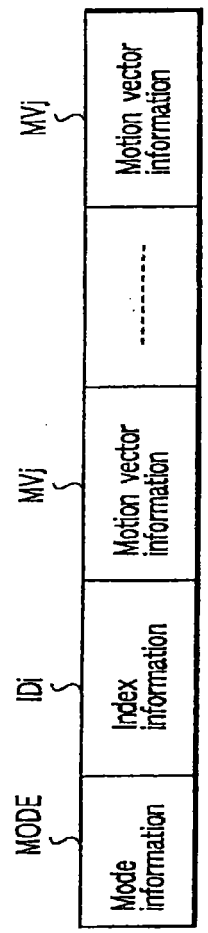
FIG. 12 is a view showing a specific example of an encoded bit stream when a prediction picture is to be generated by using one reference picture.

FIG. 12 shows a specific example of an encoded bit stream for each block when a prediction picture is generated by using one reference picture. The index information IDi is set after mode information MODE, and the motion vector information MVi is set thereafter. The motion vector information MVi is generally two-dimensional vector information. Depending on a motion compensation method in a block which is indicated by mode information, a plurality of two-dimensional vectors may further be sent.

Figure 13:
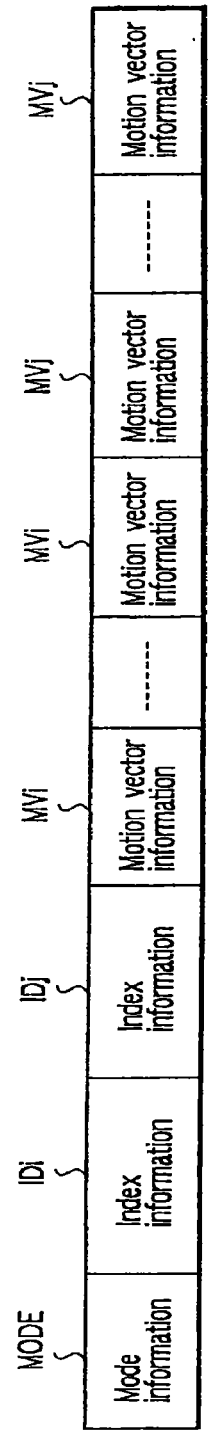
FIG. 13 is a view showing a specific example of an encoded bit stream when a prediction picture is to be generated by using two reference pictures.

FIG. 13 shows a specific example of an encoded bit stream for each block when a prediction picture is generated by using two reference pictures. Index information IDi and index information IDj are set after mode information MODE, and motion vector information MVi and motion vector information MVj are set thereafter. The motion vector information MVi and motion vector information j are generally two-dimensional vector information. Depending on a motion compensation method in a block indicated by mode information, a plurality of two-dimensional vectors may be further sent.

Note that the above structures of a syntax and bit stream can be equally applied to all the embodiments.

[Fourth Embodiment]

The fourth embodiment of the present invention will be described next with reference to FIGS. 14 and 15. Since the overall arrangements of a video encoding apparatus and video decoding apparatus in this embodiment are almost the same as those in the first embodiment, only differences from the first, second, and third embodiments will be described. In the third embodiment, encoding on a frame basis and encoding on a field basis are switched for each picture. In the fourth embodiment, encoding on a frame basis and encoding on a field basis are switched for each macroblock.

When encoding on a frame basis and encoding on a field basis are switched for each macroblock, the same reference picture number indicates different pictures, even within the same picture, depending on whether a macroblock is encoded on the frame basis or on the field basis. For this reason, with the tables shown in FIGS. 9 and 10 used in the third embodiment, a proper prediction picture signal may not be generated.

In order to solve this problem, in this embodiment, tables of combinations of reference picture numbers and predictive parameters like those shown in FIGS. 14 and 15 are prepared in a predictive parameter controller 203 in FIG. 2. Assume that when a macroblock is to be encoded on the field basis, the same predictive parameter as that corresponding to a reference picture number (reference frame index number) used when the macroblock is encoded on the frame basis is used.

FIG. 14 shows a table used when the macroblock is encoded on a field basis and a picture to be encoded is a top field. The upper and lower rows of each field index column correspond to the top field and bottom field, respectively. As shown in FIG. 14, frame index j and field index k are related such that when k=2j in the top field, k=2j+1 in the bottom field. Reference frame number m and reference field number n are related such that when n=2m in the top field, n=2m+1 in the bottom field.

FIG. 15 shows a table used when the macroblock is encoded on a field basis, and a picture to be encoded is a bottom field. As in the table shown in FIG. 14, the upper and lower rows of each field index column correspond to a top field and the bottom field, respectively. In the table in FIG. 15, frame index j and field index k are related such that when k=2+1 in the top field, k=2j in the bottom field. This makes it possible to assign a small value as field index k to an in-phase bottom field. The relationship between reference frame number m and reference field number n is the same as that in the table in FIG. 14.

When the macroblock is to be encoded on a field basis, a frame index and field index are encoded as index information by using the tables shown in FIGS. 14 and 15. When the macroblock is to be encoded on a frame basis, only the frame index common to the tables in FIGS. 14 and 15 is index-encoded as index information.

In this embodiment, predictive parameters are assigned to a frame and field by using one table. However, a table for frames and a table for fields may be separately prepared for one picture or slice.

Each embodiment described above has exemplified the video encoding/decoding scheme using orthogonal transformation on a block basis. Even if, however, another transformation technique such as wavelet transformation is used, the technique of the present invention which has been described in the above embodiments can be used.

Video encoding and decoding processing according to the present invention may be implemented as hardware (apparatus) or software using a computer. Some processing may be implemented by hardware, and the other processing may be performed by software. According to the present invention, there can be provided a program for causing a computer to execute the above video encoding or video decoding or a storage medium storing the program.

What is claimed is:

1. An electronic apparatus configured to decode encoded data obtained by subjecting a video having a luminance and two color differences to motion compensation prediction encoding, the electronic apparatus comprising:
receiver circuitry configured to receive encoded data;
decoder circuitry configured to
(1) if the encoded data for a target block comprises (a) a first weighting factor for a luminance component, (b) a second weighting factor for a first color difference component, and (c) a third weighting factor for a second color difference component, generate a prediction image for the target block at least by multiplying a first reference image by the first weighting factor, the second weighting factor and the third weighting factor and generate a decoded image for the target block by using a prediction error and the prediction image;
(2) if the encoded data for the target block comprises (a-1) a fourth weighting factor for the luminance component for a second reference image, (a-2) a fifth weighting factor for the luminance component for a third reference image, (b-1) a sixth weighting factor for the first color difference component for the second reference image, (b-2) a seventh weighting factor for the first color difference component for the third reference image, (c-1) an eighth weighting factor for the second color difference component for the second reference image, (c-2) a ninth weighting factor for the second color difference component for the third reference image, generate the prediction image for the target block by at least adding (A) a result of multiplying the second reference image by the fourth weighting factor, the sixth weighting factor and the eighth weighting factor, and (B) a result of multiplying the third reference image by the fifth weighting factor, the seventh weighting factor and the ninth weighting factor and generate the decoded image for the target block by using the prediction error and the prediction image.

2. The electronic apparatus of claim 1, further comprising a memory configured to store the encoded data, wherein the decoder circuitry is coupled to the memory.

3. The electronic apparatus of claim 1, wherein the decoder circuitry comprises dedicated hardware for decoding.

4. The electronic apparatus of claim 1, wherein the receiver circuitry is configured to receive the encoded data through a network from another electronic apparatus.

5. A method for decoding encoded data obtained by subjecting a video having a luminance and two color differences to motion compensation prediction encoding, the method comprising:
receiving, in receiver circuitry, the encoded data comprising a combination;
generating, in decoder circuitry, (1) if the encoded data for a target block comprises (a) a first weighting factor for a luminance component, (b) a second weighting factor for a first color difference component, and (c) a third weighting factor for a second color difference component, a prediction image for the target block at least by multiplying a first reference image by the first weighting factor, the second weighting factor and the third weighting factor; and
generating, by the decoder circuitry, (2) if the encoded data for the target block comprises (a-1) a fourth weighting factor for the luminance component for a second reference image, (a-2) a fifth weighting factor for the luminance component for a third reference image, (b-1) a sixth weighting factor for the first color difference component for the second reference image, (b-2) a seventh weighting factor for the first color difference component for the third reference image, (c-1) an eighth weighting factor for the second color difference component for the second reference image, and (c-2) a ninth weighting factor for the second color difference component for the third reference image, the prediction image for the target block by at least adding (A) a result of multiplying the second reference image by the fourth weighting factor, the sixth weighting factor and the eighth weighting factor, and (B) a result of multiplying the third reference image by the fifth weighting factor, the seventh weighting factor and the ninth weighting factor.

6. The electronic apparatus of claim 2, wherein the decoder circuitry comprises a general purpose hardware executing software.

7. An electronic apparatus for subjecting an input video image having a luminance and two color differences to predictive encoding, comprising:
receiver circuitry configured to receive the input video image;
encoder circuitry configured to:
determine the input video image for a target block;
generate, if the input video image for the target block comprises (a) a first weighting factor for a luminance component, (b) a second weighting factor for a first color difference component, and (c) a third weighting factor for a second color difference component, a prediction image for the target block by multiplying a first reference image by the first weighting factor, the second weighting factor and the third weighting factor and adding a first offset, a second offset and a third offset;
generate, if the input video image for the target block comprises (a-1) a fourth weighting factor for the luminance component for a second reference image, (a-2) a fifth weighting factor for the luminance component for a third reference image, (b-1) a sixth weighting factor for the first color difference component for the second reference image, (b-2) a seventh weighting factor for the first color difference component for the third reference image, (c-1) an eighth weighting factor for the second color difference component for the second reference image, and (c-2) a ninth weighting factor for the second color difference component for the third reference image, a prediction image for the target block by adding (A) a result of multiplying the second reference image by the fourth weighting factor, the sixth weighting factor and the eighth weighting factor, and (B) a result of multiplying the third reference image by the fifth weighting factor, the seventh weighting factor and the ninth weighting factor;

generate prediction error information for the target block by calculating an error between the input video image and the prediction image;

multiplex the index information and the prediction error information to generate multiplexed information; and output the multiplexed information.

8. The electronic apparatus of claim 7 further comprising a memory configured to store the multiplexed information, wherein the encoder circuitry coupled to the memory.

9. The electronic apparatus of claim 7, wherein the encoder circuitry comprises a general purpose hardware executing software.

10. The electronic apparatus of claim 7, wherein the encoder circuitry comprises a dedicated hardware for encoding.

11. The electronic apparatus of claim 7 further comprising transmitting circuitry configured to transmit the multiplexed information through network to another electronic apparatus.

12. A method for subjecting an input video image having a luminance and two color differences to predictive encoding, the method comprising:

determining the input video image for a target block;

generating, in encoder circuitry, if the input video image for the target block indicates the combination comprising (a) a first weighting factor for a luminance component, (b) a second weighting factor for a first color difference component, (c) a third weighting factor for a second color difference component, a prediction image for the target block by multiplying a first reference image by the first weighting factor, the second weighting factor and the third weighting factor and adding a first offset, a second offset and a third offset;

generating, in the encoder circuitry, if the input video image for the target block comprises (a-1) a fourth weighting factor for the luminance component for a second reference image, (a-2) a fifth weighting factor for the luminance component for a third reference image, (b-1) a sixth weighting factor for the first color difference component for the second reference image, (b-2) a seventh weighting factor for the first color difference component for the third reference image, (c-1) an eighth weighting factor for the second color difference component for the second reference image, and (c-2) a ninth weighting factor for the second color difference component for the third reference image, a prediction image for the target block by adding (A) a result of multiplying the second reference image by the fourth weighting factor, the sixth weighting factor and the eighth weighting factor, and (B) a result of multiplying the third reference image by the fifth weighting factor, the seventh weighting factor and the ninth weighting factor;

generating, in the encoder circuitry, prediction error information for the target block by calculating an error between the input video image and the prediction image;

multiplexing the index information and the prediction error information to generate multiplexed information; and outputting the multiplexed information.

* * * * *